US012689114B2

(12) United States Patent
Tsai et al.

(10) Patent No.: US 12,689,114 B2
(45) Date of Patent: Jul. 21, 2026

(54) ANTENNA STRUCTURE

(71) Applicants: ONEWAVE TECHNOLOGY CO., LTD., Taipei City (TW); Yun-Chan Tsai, Taipei City (TW)

(72) Inventors: Yun-Chan Tsai, Taipei City (TW); Shi-Yu Chiu, Taipei City (TW); Po-Huai Huang, Taipei City (TW); Shi-Hong Yang, Taipei City (TW)

(73) Assignees: ONEWAVE TECHNOLOGY CO., LTD., Taipei City (TW); Yun-Chan Tsai, Taipei City (TW)

( * ) Notice: Subject to any disclaimer, the term of this patent is extended or adjusted under 35 U.S.C. 154(b) by 318 days.

(21) Appl. No.: 18/377,761

(22) Filed: Oct. 6, 2023

(65) Prior Publication Data

US 2025/0118886 A1 Apr. 10, 2025

(51) Int. Cl.
*H01Q 1/24* (2006.01)
*H01Q 1/48* (2006.01)

(52) U.S. Cl.
CPC ............... *H01Q 1/243* (2013.01); *H01Q 1/48* (2013.01)

(58) Field of Classification Search
CPC ................................ H01Q 1/243; H01Q 1/48
See application file for complete search history.

(56) References Cited

FOREIGN PATENT DOCUMENTS

CN 222927778 U * 5/2025

* cited by examiner

*Primary Examiner* — Henry Luong
(74) *Attorney, Agent, or Firm* — HDLS IPR SERVICES; Chun-Ming Shih

(57) ABSTRACT

An antenna structure is electrically fixed and connected to a main board of an electronic apparatus and includes a circuit board, a high-frequency radiation layer, and a low-frequency radiation layer. The circuit board is a square body with a front surface, a back surface, a top surface, a bottom surface, and two side surfaces. The high-frequency radiation layer is arranged on the front surface of the circuit board and includes a high-frequency coupling edge thereon. The low-frequency radiation layer is arranged on the back surface of the circuit board and includes a low-frequency coupling edge thereon. Moreover, the high-frequency radiation layer and the low-frequency radiation layer fail to overlap with each other. The high-frequency coupling edge and the low-frequency coupling edge couple together to generate a bandwidth of a transmitting-and-receiving frequency of the antenna structure.

18 Claims, 8 Drawing Sheets

ANTENNA STRUCTURE

BACKGROUND OF THE DISCLOSURE

Technical Field

The present disclosure relates to an antenna, and especially relates to a vertical antenna structure soldered on a circuit board.

Description of Related Art

With the popularity of the Internet, people are increasingly dependent on the Internet, and more and more Internet apparatuses have been developed, such as Wi-Fi products, Internet communication products, Internet of Things, webcams, IP CAM, routers, or modems, etc. equipment. Most of the antenna structures used in these apparatuses are made of different radiation layer patterns on the copper foils on the circuit boards to receive and transmit signals.

The design of the antenna structure in the past was to prepare a printed circuit board with patterns of the high-frequency radiation layer and the low-frequency radiation layer on the front surface and the back surface of the printed circuit board respectively. After the high-frequency radiation layer and the low-frequency radiation layer are electrically connected to the ground layer of the main board, the high-frequency radiation layer and the low-frequency radiation layer couple out a bandwidth capable of transmitting and receiving frequencies. Although the aforementioned high-frequency radiation layer and the low-frequency radiation layer are arranged on the front surface and the back surface of the printed circuit board, the high-frequency radiation layer and the low-frequency radiation layer overlap with each other, causing mutual interference, blocking, or shielding, resulting in a reduction in the transmitting-and-receiving performance and characteristics of the antenna structure.

Most of the currently used antenna structures belong to the vertical type and are soldered on the main board of the electronic apparatus. When the vertical antenna structure is soldered to the main board, the antenna structure is provided that the electrode layer on the circuit board is directly soldered to the electrode layer on the main board. Since the electrode layers of the antenna structure use a large area or a larger number, accordingly the copper material used is also relatively large, which leads to an increase in the manufacturing cost. Moreover, when the vertical antenna structure is soldered to the main board, one or several holes must be drilled on the main board where the antenna structure is soldered, so that the antenna structure may be directly inserted into the hole in an upright manner, allowing the electrode layer on the antenna structure may be electrically fixed and connected to the electrode layer on the edge of the hole. In this way, although the antenna structure may be vertically soldered on the main board, such design will destroy the original structural design of the main board, thus causing labor-intensive and time-consuming troublesome procedures in production.

Moreover, in the design process of the radiation layer of the vertical antenna structure, when the transmitting-and-receiving frequency of the radiation layer has to reach a certain specific transmitting-and-receiving frequency, if the area of the antenna structure body is not enough, the pattern shape of the radiation layer will be difficult to design, and then it is necessary to make another radiation layer on the main board to be electrically connected to the radiation layer on the antenna structure, so as to extend the length of the radiation layer of the antenna structure. In this way, it will increase the difficulty of manufacturing the antenna structure and the main board.

Therefore, how to improve the transmitting-and-receiving frequency, the performance, and the characteristics of the antenna structure, and how to reduce the production cost of the antenna structure, without destroying the structural design of the original main board, and how to extend the length of the radiation layer according to the transmitting-and-receiving frequency of the antenna structure, are the main problems to be solved by the present disclosure.

SUMMARY OF THE DISCLOSURE

Therefore, the main object of the present disclosure is to solve the traditional deficiencies. The present disclosure redesigns the antenna structure such that the high-frequency radiation layer and the low-frequency radiation layer of the antenna structure do not overlap with each other and do not cause mutual interference, blocking, or shielding, and may reduce the production cost of the antenna structure without destroying the structural design of the original main board. The length of the radiation layer may be extended according to the requirements of the transmitting-and-receiving frequency of the antenna structure.

In order to achieve the object mentioned above, the present disclosure provides an antenna structure which is electrically fixed and connected to a main board of an electronic apparatus and which includes a circuit board, a high-frequency radiation layer, and a low-frequency radiation layer. The circuit board is a square body with a front surface, a back surface, a top surface, a bottom surface, and two side surfaces. The high-frequency radiation layer is arranged on the front surface of the circuit board and includes a high-frequency coupling edge thereon. The low-frequency radiation layer is arranged on the back surface of the circuit board and includes a low-frequency coupling edge thereon. Moreover, the high-frequency radiation layer and the low-frequency radiation layer fail to overlap with each other. The high-frequency coupling edge and the low-frequency coupling edge couple together to generate a bandwidth of a transmitting-and-receiving frequency of the antenna structure.

In an embodiment of the present disclosure, the high-frequency coupling edge includes a high-frequency straight edge and a high-frequency oblique edge.

In an embodiment of the present disclosure, the high-frequency radiation layer is arranged on the front surface of the circuit board; the circuit board further includes a bare area which is on the back surface of the circuit board and which is corresponding to the high-frequency radiation layer. The antenna structure further includes another high-frequency radiation layer arranged on the bare area. The another high-frequency radiation layer arranged on the bare area on the back surface overlaps with the high-frequency radiation layer on the front surface, and the another high-frequency radiation layer arranged on the bare area on the back surface is electrically connected to the high-frequency radiation layer on the front surface, to form a dual-path high-frequency radiation layer.

In an embodiment of the present disclosure, the low-frequency radiation layer includes a first low-frequency radiation layer and a second low-frequency radiation layer. Moreover, the first low-frequency radiation layer is arranged on the back surface of the circuit board. The first low-frequency radiation layer includes the low-frequency coupling edge. The low-frequency coupling edge includes a low-frequency straight edge and a low-frequency oblique edge.

In an embodiment of the present disclosure, the second low-frequency radiation layer is U-shaped and arranged on a naked area of the front surface of the circuit board, and overlaps with the first low-frequency radiation layer on the back surface of the circuit board, and is electrically connected to the first low-frequency radiation layer on the back surface of the circuit board, to form a dual-path low-frequency radiation layer.

In an embodiment of the present disclosure, a frequency of the high-frequency radiation layer is 5.15 GHz to 5.85 GHz and 5.925 GHz to 7.125 GHz.

In an embodiment of the present disclosure, a frequency of the low-frequency radiation layer is 2.4 GHz to 2.5 GHz.

In an embodiment of the present disclosure, the high-frequency coupling edge and the low-frequency coupling edge are symmetrical or asymmetrical graphic designs.

In an embodiment of the present disclosure, the high-frequency coupling edge and the low-frequency coupling edge are straight edges, oblique edges, or polygons, or a mixture of two or more shapes.

In an embodiment of the present disclosure, the antenna structure further includes a coupling distance between the high-frequency coupling edge and the low-frequency coupling edge.

In an embodiment of the present disclosure, the coupling distance is 0 mm to 8 mm.

In an embodiment of the present disclosure, the coupling distance is 0 mm to 3 mm.

In an embodiment of the present disclosure, the circuit board further includes a plurality of semi-hole electrode layers on the bottom surface of the circuit board. One of the semi-hole electrode layers is electrically connected to the high-frequency radiation layer on the front surface of the circuit board and a first electrode layer on a bare area on the back surface. Another one of the semi-hole electrode layers is electrically connected to the low-frequency radiation layer on the back surface of the circuit board and a second electrode layer on a naked area on the front surface.

In an embodiment of the present disclosure, the circuit board further includes a plurality of semi-hole electrode layers on the bottom surface of the circuit board. One of the semi-hole electrode layers is electrically connected to the high-frequency radiation layer on the front surface of the circuit board and another high-frequency radiation layer on a bare area on the back surface. Another one of the semi-hole electrode layers is electrically connected to a first low-frequency radiation layer of the low-frequency radiation layer on the back surface of the circuit board and a second low-frequency radiation layer of the low-frequency radiation layer on a naked area of the front surface.

In an embodiment of the present disclosure, still another one of the semi-hole electrode layers is arranged on one of the side surfaces or on the top surface of the circuit board. The still another one of the semi-hole electrode layers is electrically connected to the high-frequency radiation layer, so that a radiation field pattern of the antenna structure is better (improved).

In an embodiment of the present disclosure, the semi-hole electrode layers are semi-circular, semi-elliptical, or polygonal.

In an embodiment of the present disclosure, the circuit board further includes a side radiation layer on the top surface or on one of the side surfaces of the circuit board. The side radiation layer is electrically connected to the high-frequency radiation layer, so that a radiation field pattern of the antenna structure is better (improved).

In an embodiment of the present disclosure, the main board includes a first ground layer, a second ground layer, a first clearance zone, a second clearance zone, a first electrode fixed-connection layer, and a second electrode fixed-connection layer. The first ground layer is arranged on a front face of the main board. The second ground layer is arranged on a back face of the main board and is arranged symmetrically with the first ground layer. The first clearance zone is arranged on the front face of the main board. The second clearance zone is arranged on the back face of the main board and is arranged symmetrically with the first clearance zone. The first electrode fixed-connection layer and the second electrode fixed-connection layer are arranged on the first clearance zone. Moreover, the main board further includes a signal feed-in layer arranged on the front face of the main board and coupled with the first ground layer. The signal feed-in layer is electrically connected to the first electrode fixed-connection layer.

In an embodiment of the present disclosure, the main board further includes a plurality of matching elements; the first electrode fixed-connection layer and the second electrode fixed-connection layer are each electrically connected to the first ground layer through the matching elements; the matching elements are used to adjust an antenna characteristic of the antenna structure.

In an embodiment of the present disclosure, the first clearance zone and the second clearance zone have a length of 10 mm to 20 mm and a width of 3 mm to 8 mm.

DETAILED DESCRIPTION

Figure 1:
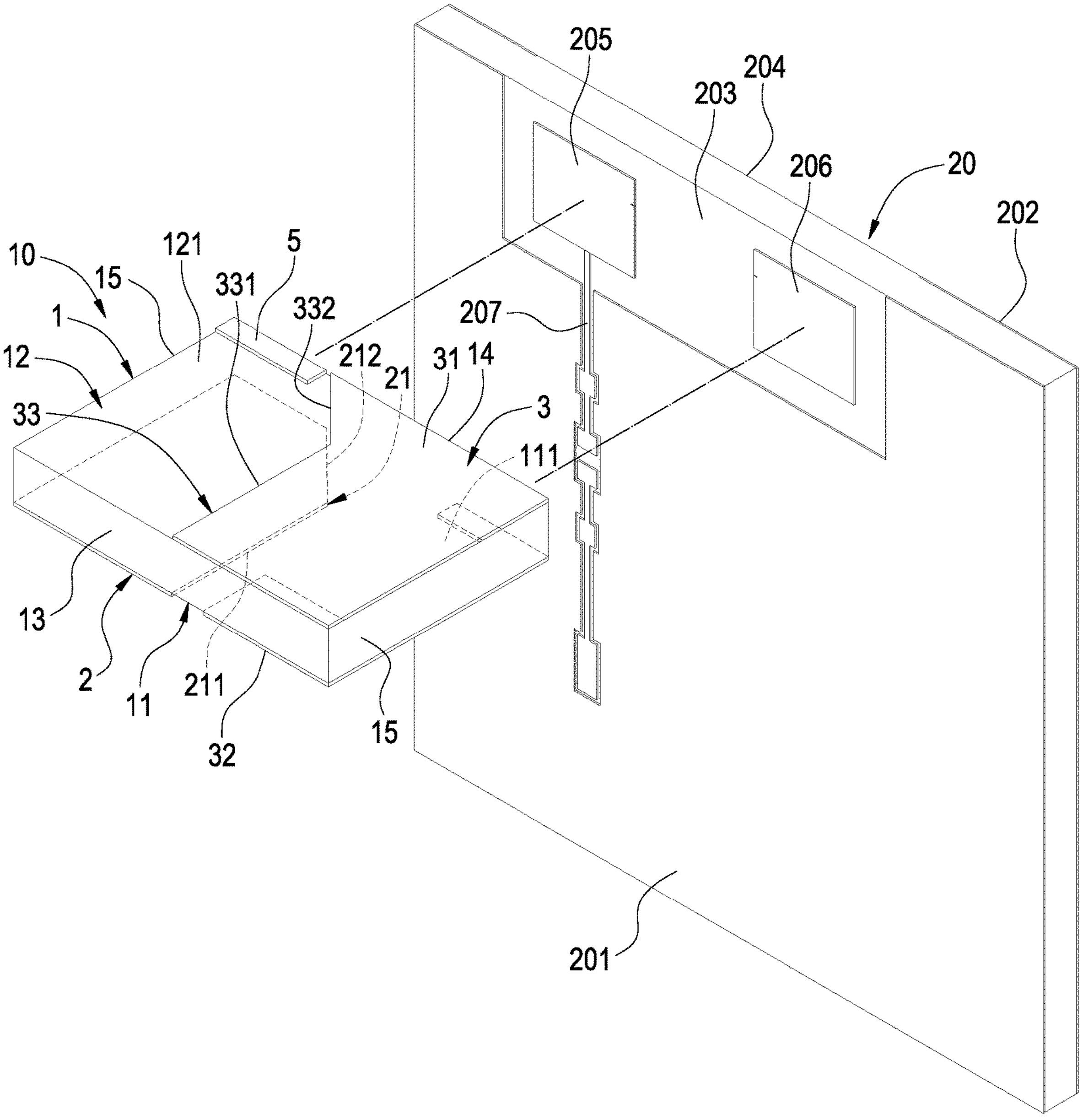
FIG. 1 shows an exploded schematic diagram of the antenna structure and the main board of the first embodiment of the present disclosure.
Figure 2:
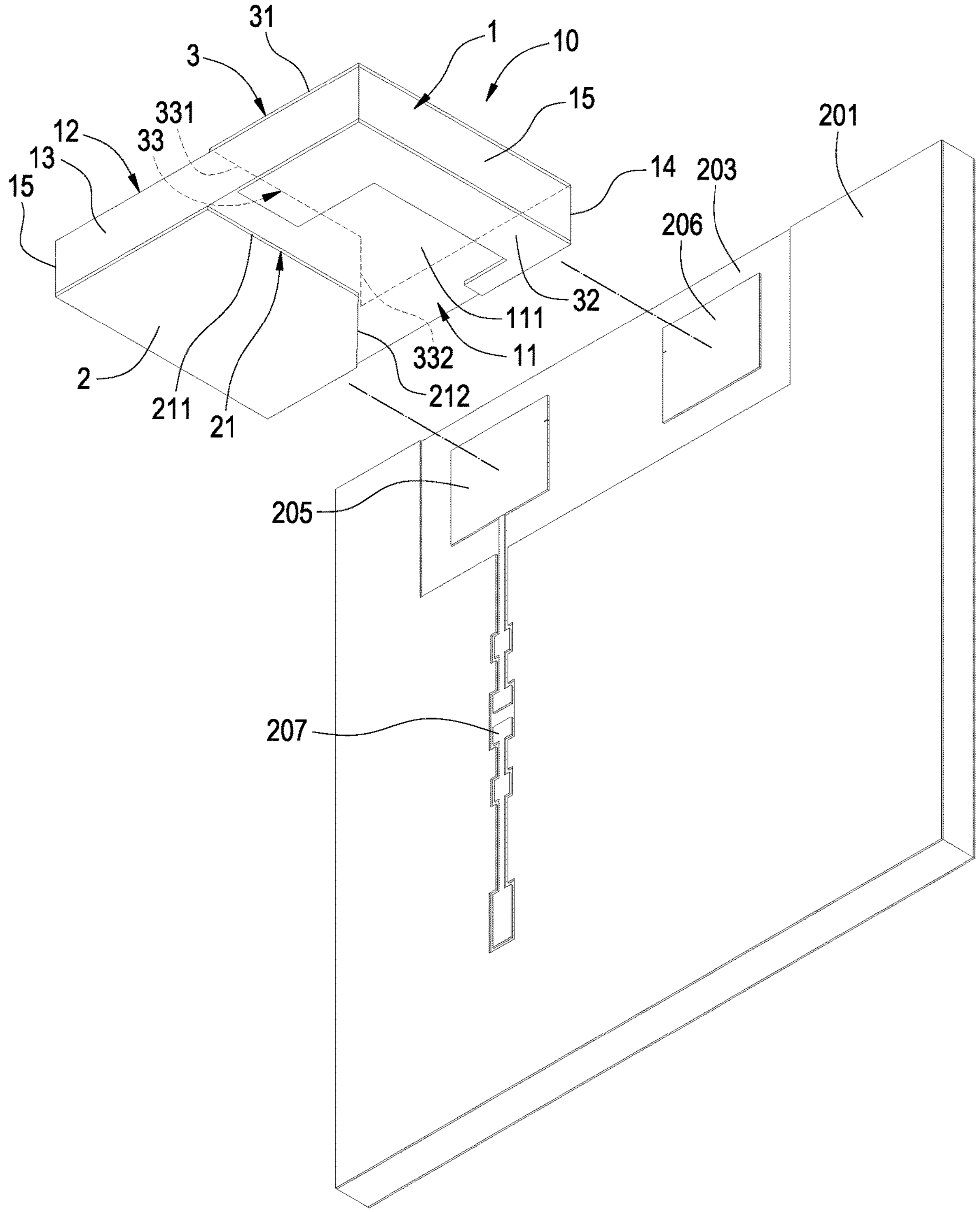
FIG. 2 shows an exploded schematic diagram of the antenna structure and the main board from another perspective of FIG. 1.
Figure 3:
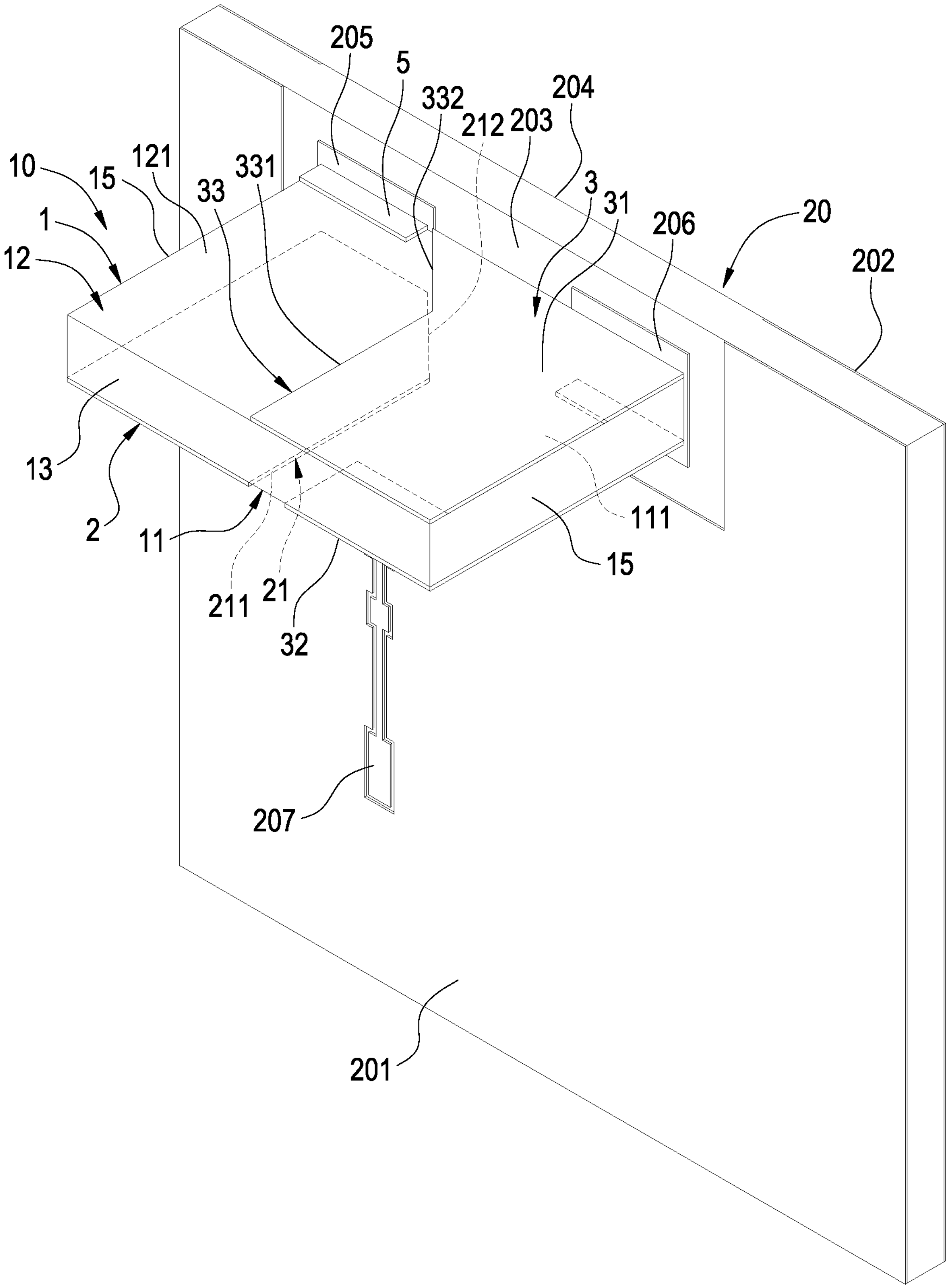
FIG. 3 shows a three-dimensional assembly schematic diagram of FIG. 1.
Figure 4:
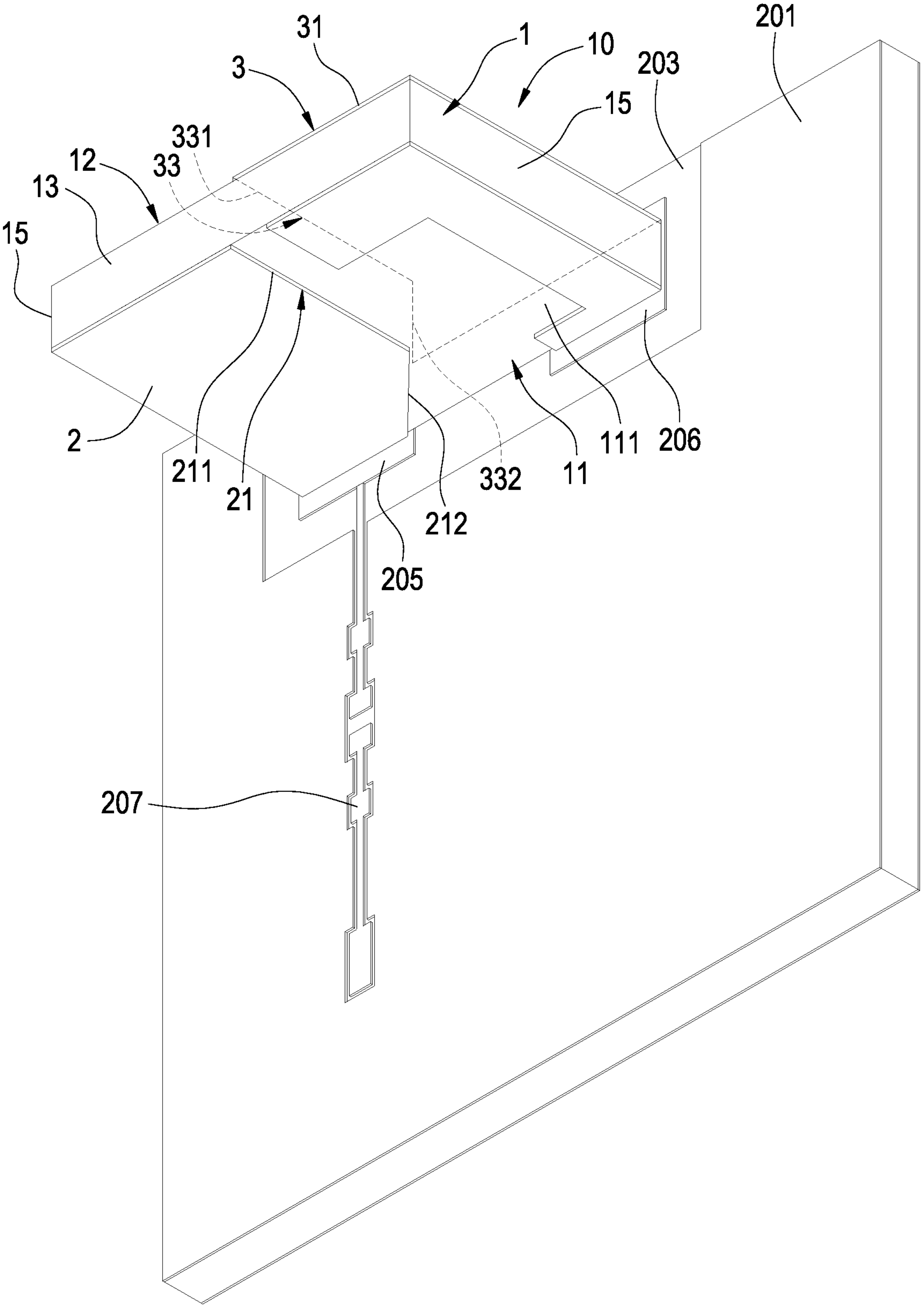
FIG. 4 shows a three-dimensional assembly schematic diagram of FIG. 2.

The technical content and detailed description of the present disclosure are hereby explained as follows with the diagrams:

FIG. 1 shows an exploded schematic diagram of the antenna structure and the main board of the first embodiment of the present disclosure. FIG. 2 shows an exploded schematic diagram of the antenna structure and the main board from another perspective of FIG. 1. FIG. 3 shows a three-dimensional assembly schematic diagram of FIG. 1. FIG. 4 shows a three-dimensional assembly schematic diagram of FIG. 2. As shown in FIG. 1 to FIG. 4, the antenna structure 10 (which is vertical) of the present disclosure includes a circuit board 1, a high-frequency radiation layer 2, and a low-frequency radiation layer 3. Moreover, the high-frequency radiation layer 2 and the low-frequency radiation layer 3 do not overlap with each other and do not cause mutual interference, blocking, or shielding, to increase the antenna transmitting-and-receiving performance.

The circuit board 1 is a square body (or a cuboid) with a front surface 11, a back surface 12, a top surface 13, a bottom surface 14 and two side surfaces 15. In FIG. 1 to FIG. 4, the circuit board 1 is a printed circuit board.

The high-frequency radiation layer 2 is arranged on the front surface 11 of the circuit board 1. The high-frequency radiation layer 2 includes a high-frequency coupling edge 21. The high-frequency coupling edge 21 includes a high-frequency straight edge 211 and a high-frequency oblique edge 212. In FIG. 1 to FIG. 4, a frequency of the high-frequency radiation layer 2 is 5.15 GHz to 5.85 GHz and 5.925 GHz to 7.125 GHz.

It is worth mentioning that the high-frequency radiation layer 2 is arranged on the front surface 11 of the circuit board 1. The circuit board 1 further includes a bare area 121 which is on the back surface 12 of the circuit board 1 and which is corresponding to the high-frequency radiation layer 2. The antenna structure 10 further includes an electrode layer 5 arranged on the bare area 121 or another high-frequency radiation layer (not shown in FIG. 1 to FIG. 4) arranged on the bare area 121. The another high-frequency radiation layer arranged on the bare area 121 on the back surface 12 overlaps with the high-frequency radiation layer 2 on the front surface 11 of the circuit board 1, and the another high-frequency radiation layer arranged on the bare area 121 on the back surface 12 is electrically connected to the high-frequency radiation layer 2 on the front surface 11 of the circuit board 1, to form the high-frequency radiation layer 2 with a dual-path design, to increase the transmitting-and-receiving performance of the antenna structure 10.

The low-frequency radiation layer 3 includes a first low-frequency radiation layer 31 and a second low-frequency radiation layer 32. Moreover, the first low-frequency radiation layer 31 is arranged on the back surface 12 of the circuit board 1. The low-frequency radiation layer 3 and the high-frequency radiation layer 2 do not overlap with each other and do not cause mutual interference, blocking, or shielding. Similarly, the first low-frequency radiation layer 31 includes a low-frequency coupling edge 33. The low-frequency coupling edge 33 includes a low-frequency straight edge 331 and a low-frequency oblique edge 332. Moreover, the second low-frequency radiation layer 32 is U-shaped and arranged on a naked area 111 of the front surface 11 of the circuit board 1, and overlaps with the first low-frequency radiation layer 31 on the back surface 12 of the circuit board 1, and is electrically connected to the first low-frequency radiation layer 31 on the back surface 12 of the circuit board 1. The first low-frequency radiation layer 31 and the second low-frequency radiation layer 32 of the low-frequency radiation layer 3 are arranged on the front surface 11 and the back surface 12 of the circuit board 1 respectively, to form the low-frequency radiation layer 3 with a dual-path design, to increase the efficiency of the low-frequency radiation layer 3. In FIG. 1 to FIG. 4, a frequency of the low-frequency radiation layer 3 is 2.4 GHz to 2.5 GHZ.

When the antenna structure 10 of the present disclosure is used with the main board 20 of the electronic apparatus, a first ground layer 201, a second ground layer 202, a first clearance zone 203, and a second clearance zone 204 are symmetrically arranged on a front face and a back face of the main board 20 respectively; namely, the main board 20 includes the first ground layer 201, the second ground layer 202, the first clearance zone 203, and the second clearance zone 204; the first ground layer 201 arranged on the front face is symmetrical with the second ground layer 202 arranged on the back face; the first clearance zone 203 arranged on the front face is symmetrical with the second clearance zone 204 arranged on the back face. The main board 20 further includes a first electrode fixed-connection layer 205 and a second electrode fixed-connection layer 206 arranged on the first clearance zone 203 of the main board 20. Moreover, the main board 20 further includes a signal feed-in layer 207 arranged on the front face of the main board 20 and coupled with the first ground layer 201. The signal feed-in layer 207 is electrically connected to the first electrode fixed-connection layer 205. Meanwhile, the main board 20 further includes a plurality of matching elements (inductors or capacitors); the first electrode fixed-connection layer 205 and the second electrode fixed-connection layer 206 are each electrically connected to the first ground layer 201 through the matching elements; the matching elements are used to adjust the antenna characteristics of the antenna structure 10, such that the antenna structure 10 may be adjusted for optimal transmitting-and-receiving effect. In FIG. 1 to FIG. 4, the first clearance zone 203 and the second clearance zone 204 have a length (L) of 10 mm to 20 mm and a width of 3 mm to 8 mm.

When the antenna structure 10 and the main board 20 are soldered, the high-frequency radiation layer 2 and the electrode layer 5 on the circuit board 1 are electrically fixed and connected to the first electrode fixed-connection layer 205; the first low-frequency radiation layer 31 and the second low-frequency radiation layer 32 of the low-frequency radiation layer 3 are electrically fixed and connected to the second electrode fixed-connection layer 206.

Figure 5:
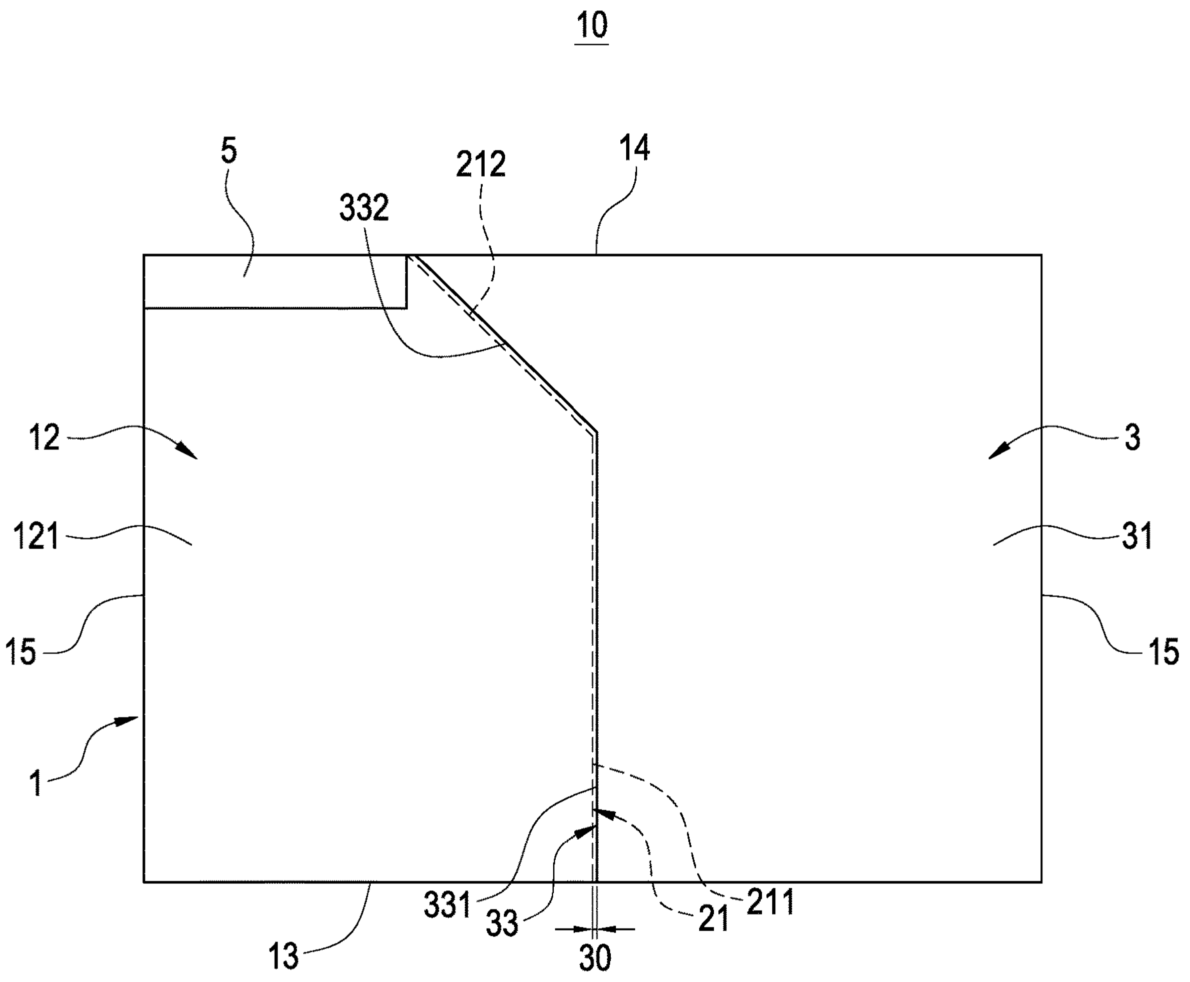
FIG. 5 shows a schematic front view of the antenna structure of the first embodiment of the present disclosure.

FIG. 5 shows a schematic front view of the antenna structure of the first embodiment of the present disclosure. As shown in FIG. 5, the high-frequency radiation layer 2 and the low-frequency radiation layer 3 of the antenna structure 10 of the present disclosure are respectively arranged on the front surface 11 and the back surface 12 of the circuit board 1. The high-frequency radiation layer 2 and the low-frequency radiation layer 3 do not overlap with each other and do not cause mutual interference, blocking, or shielding. The high-frequency coupling edge 21 of the high-frequency radiation layer 2 and the low-frequency coupling edge 33 of the low-frequency radiation layer 3 couple together to generate the transmitting-and-receiving frequency, the characteristics, and the performance of the antenna structure 10.

Moreover, the high-frequency coupling edge 21 and the low-frequency coupling edge 33 of the high-frequency radiation layer 2 and the low-frequency radiation layer 3 may use symmetrical or asymmetrical graphic designs, such as straight edges, oblique edges, or polygons, or a mixture change of two or more shapes, which may increase the bandwidth of the high-frequency radiation layer 2 and the low-frequency radiation layer 3.

Moreover, the antenna structure 10 further includes a coupling distance 30 between the high-frequency coupling edge 21 of the high-frequency radiation layer 2 and the low-frequency coupling edge 33 of the low-frequency radiation layer 3; the coupling distance 30 is used to achieve the required characteristics of the antenna structure 10. Compared with the prior art antenna structure that the high-frequency radiation layer and the low-frequency radiation layer of the prior art antenna structure overlap with each other and cause mutual interference, blocking, or shielding, the high-frequency radiation layer and the low-frequency radiation layer of the antenna structure 10 of the present disclosure do not overlap with each other and do not cause mutual interference, blocking, or shielding, which may improve the efficiency, the field pattern, and the measured data of the antenna structure 10. In FIG. 1 to FIG. 4, the coupling distance 30 is 0 mm to 8 mm, wherein 0 mm to 3 mm is the best.

Figure 6:
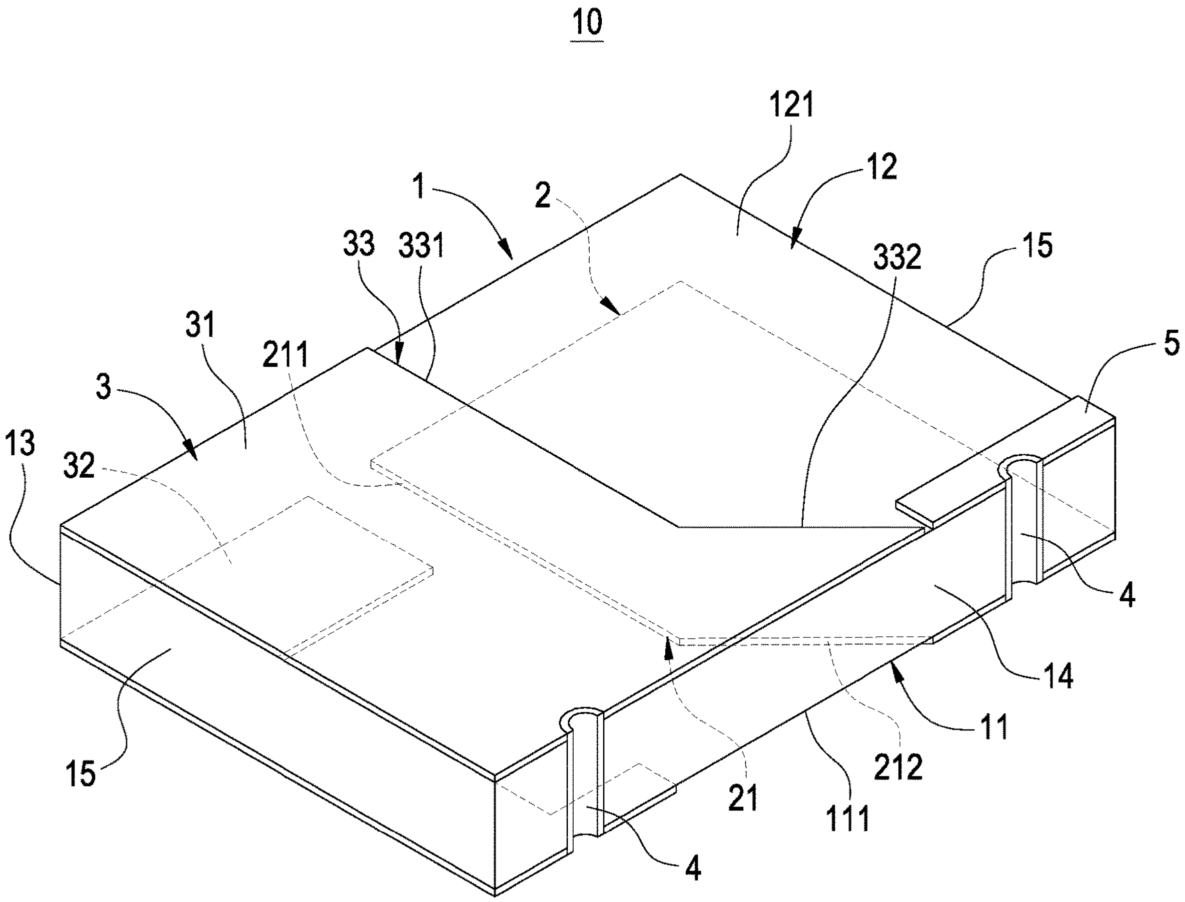
FIG. 6 shows a schematic perspective view of the appearance of the antenna structure of the second embodiment of the present disclosure.

FIG. 6 shows a schematic perspective view of the appearance of the antenna structure of the second embodiment of the present disclosure. As shown in FIG. 6, the embodiment is substantially the same as the first embodiment, except that the circuit board 1 further includes a plurality of semi-hole electrode layers 4 arranged on the bottom surface 14 of the circuit board 1. One of the semi-hole electrode layers 4 is electrically connected to the high-frequency radiation layer 2 on the front surface 11 of the circuit board 1 and an electrode layer 5 (or another high-frequency radiation layer, which is not shown in FIG. 6) on the bare area 121 on the back surface 12. Another one of the semi-hole electrode layers 4 is electrically connected to the low-frequency radiation layer 3 (or the first low-frequency radiation layer 31) on the back surface 12 of the circuit board 1 and an electrode layer (not shown in FIG. 6, or the second low-frequency radiation layer 32) on the naked area 111 on the front surface 11.

The design of the semi-hole electrode layer 4 is to reduce the manufacturing cost of the antenna structure 10, and under the principle of not destroying the original structure of the main board 20, the antenna structure 10 is electrically fixed and connected to the first electrode fixed-connection layer 205 and the second electrode fixed-connection layer 206 on the main board 20. In FIG. 6, the semi-hole electrode layers 4 are semi-circular, semi-elliptical, or polygonal.

Figure 7:
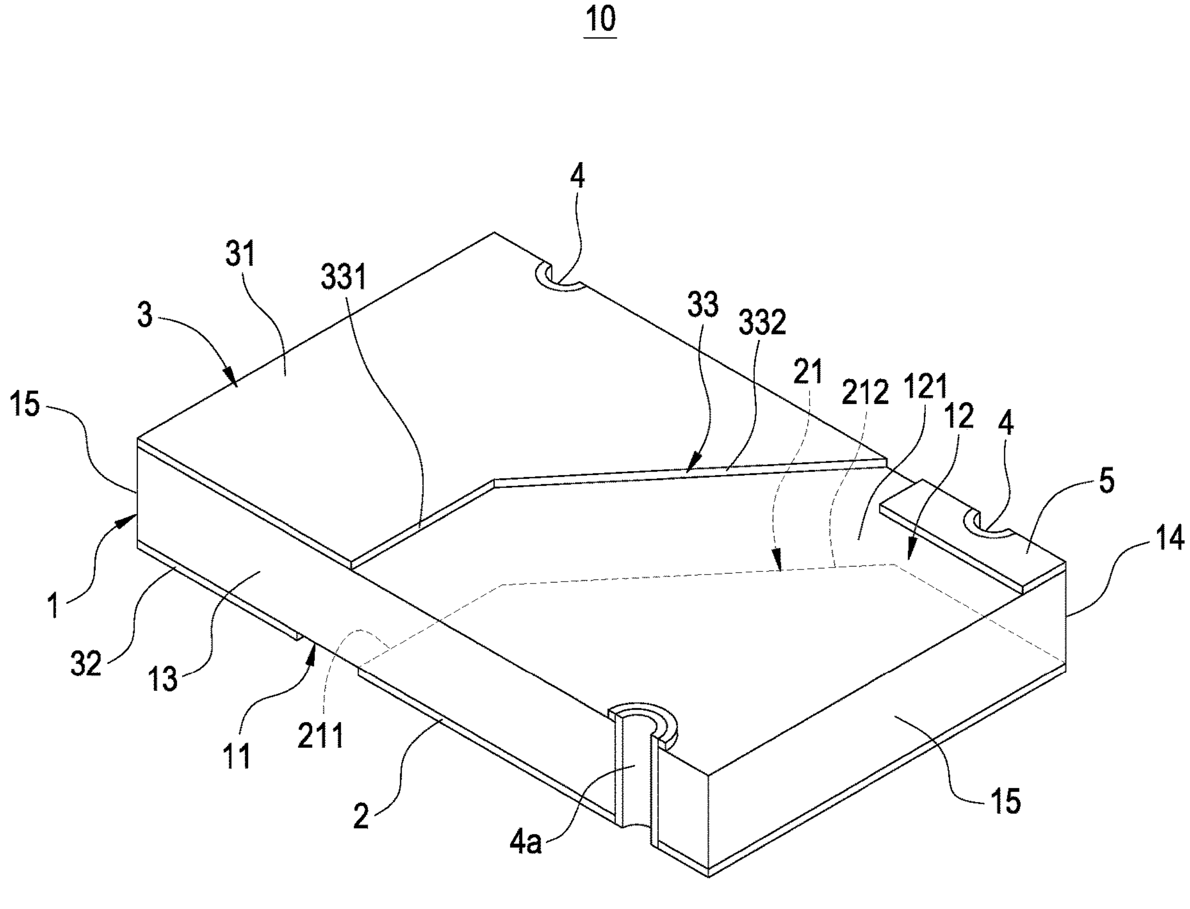
FIG. 7 shows a schematic perspective view of the appearance of the antenna structure of the third embodiment of the present disclosure.

FIG. 7 shows a schematic perspective view of the appearance of the antenna structure of the third embodiment of the present disclosure. As shown in FIG. 7, the embodiment is substantially the same as the first embodiment and the second embodiment, except that in addition to being arranged on the bottom surface 14 and used as the electrode layer, the semi-hole electrode layer 4*a* may also be arranged on the top surface 13 of the circuit board 1 to be electrically connected to the high-frequency radiation layer 2, so that the radiation field pattern of the antenna structure 10 is better (improved), to improve the transmitting-and-receiving performance and gain of the antenna structure 10.

Figure 8:
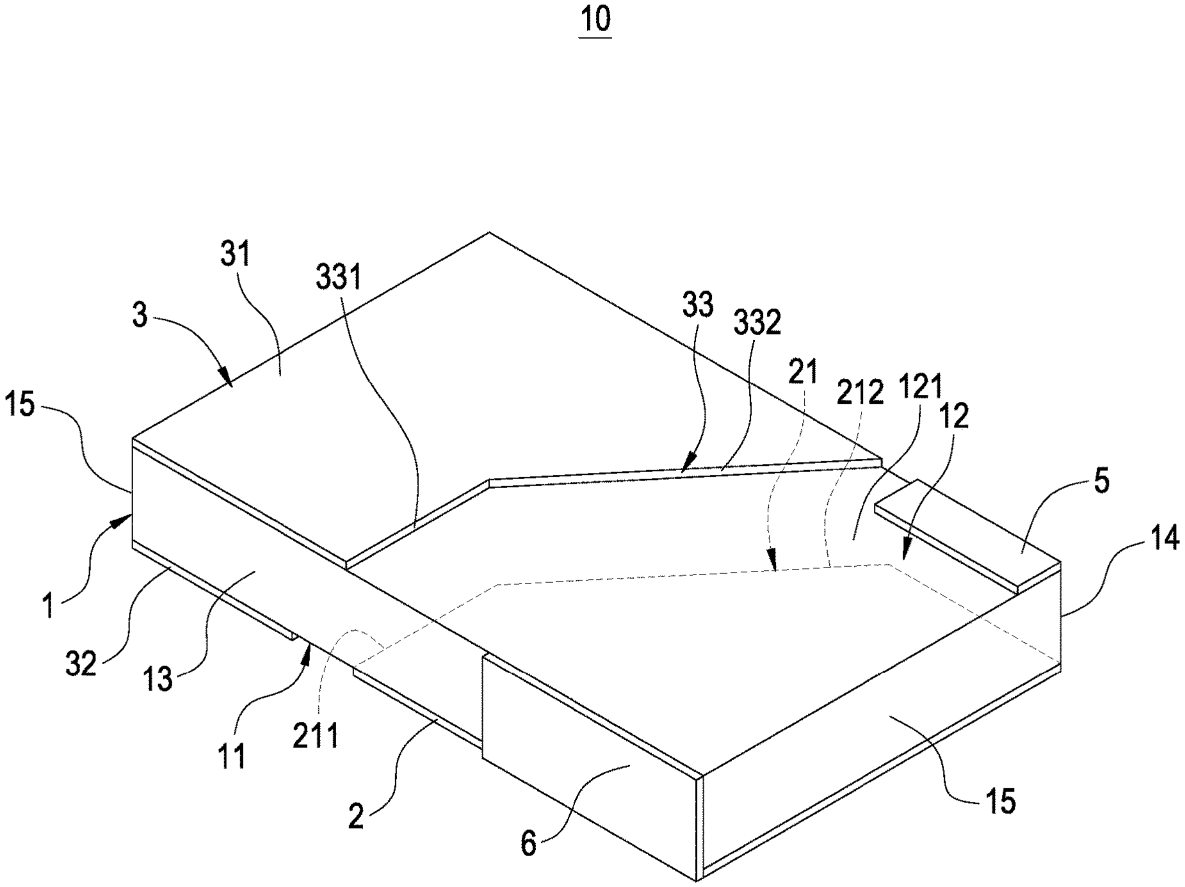
FIG. 8 shows a schematic perspective view of the appearance of the antenna structure of the fourth embodiment of the present disclosure.

FIG. 8 shows a schematic perspective view of the appearance of the antenna structure of the fourth embodiment of the present disclosure. As shown in FIG. 8, the embodiment is substantially the same as the first embodiment and the second embodiment, except that the circuit board 1 further includes a side radiation layer 6 on the top surface 13 or on one of the side surfaces 15 of the circuit board 1. The side radiation layer 6 is electrically connected to the high-frequency radiation layer 2, so that the radiation field pattern of the antenna structure 10 is better (improved), to improve the transmitting-and-receiving performance and gain of the antenna structure 10.

However, the above description is only preferred embodiments of the present disclosure, and is not intended to limit the scope of patent protection of the present disclosure. Therefore, the present disclosure states that all equivalent changes made by using the specifications or drawings of the present disclosure are equally included within the scope of patent protection of the present disclosure.

What is claimed is:

1. An antenna structure electrically fixed and connected to a main board of an electronic apparatus and comprising:

a circuit board, being a square body with a front surface, a back surface, a top surface, a bottom surface, and two side surfaces;

a high-frequency radiation layer arranged on the front surface of the circuit board and comprising a high-frequency coupling edge thereon; and a low-frequency radiation layer arranged on the back surface of the circuit board and comprising a low-frequency coupling edge thereon, wherein the high-frequency radiation layer and the low-frequency radiation layer fail to overlap with each other.

2. The antenna structure of claim 1, wherein the high-frequency coupling edge comprises a high-frequency straight edge and a high-frequency oblique edge.

3. The antenna structure of claim 2, wherein the high-frequency radiation layer is arranged on the front surface of the circuit board; the circuit board further comprises a bare area on the back surface of the circuit board and corresponding to the high-frequency radiation layer; the antenna structure further comprises another high-frequency radiation layer arranged on the bare area; the another high-frequency radiation layer arranged on the bare area on the back surface overlaps with the high-frequency radiation layer on the front surface, and the another high-frequency radiation layer arranged on the bare area on the back surface is electrically connected to the high-frequency radiation layer on the front surface, to form a dual-path high-frequency radiation layer.

4. The antenna structure of claim 3, wherein the low-frequency radiation layer comprises a first low-frequency radiation layer and a second low-frequency radiation layer; the first low-frequency radiation layer is arranged on the back surface of the circuit board; the first low-frequency radiation layer comprises the low-frequency coupling edge; the low-frequency coupling edge comprises a low-frequency straight edge and a low-frequency oblique edge.

5. The antenna structure of claim 4, wherein the second low-frequency radiation layer is U-shaped and arranged on a naked area of the front surface of the circuit board, and overlaps with the first low-frequency radiation layer on the back surface of the circuit board, and is electrically connected to the first low-frequency radiation layer on the back surface of the circuit board, to form a dual-path low-frequency radiation layer.

6. The antenna structure of claim 1, wherein a frequency of the high-frequency radiation layer is 5.15 GHz to 5.85 GHz and 5.925 GHz to 7.125 GHz.

7. The antenna structure of claim 1, wherein a frequency of the low-frequency radiation layer is 2.4 GHz to 2.5 GHz.

8. The antenna structure of claim 1, wherein the high-frequency coupling edge and the low-frequency coupling edge are symmetrical or asymmetrical graphic designs.

9. The antenna structure of claim 1, wherein the high-frequency coupling edge and the low-frequency coupling edge are straight edges, oblique edges, or polygons, or a mixture of two or more shapes.

10. The antenna structure of claim 1, further comprising a coupling distance between the high-frequency coupling edge and the low-frequency coupling edge.

11. The antenna structure of claim 10, wherein the coupling distance is 0 mm to 8 mm.

12. The antenna structure of claim 11, wherein the coupling distance is 0 mm to 3 mm.

13. The antenna structure of claim 1, wherein the circuit board further comprises a plurality of semi-hole electrode layers on the bottom surface of the circuit board; one of the semi-hole electrode layers is electrically connected to the high-frequency radiation layer on the front surface of the circuit board and a first electrode layer on a bare area on the back surface; another one of the semi-hole electrode layers is electrically connected to the low-frequency radiation layer on the back surface of the circuit board and a second electrode layer on a naked area on the front surface.

14. The antenna structure of claim 1, wherein the circuit board further comprises a plurality of semi-hole electrode layers on the bottom surface of the circuit board; one of the semi-hole electrode layers is electrically connected to the high-frequency radiation layer on the front surface of the circuit board and another high-frequency radiation layer on a bare area on the back surface; another one of the semi-hole electrode layers is electrically connected to a first low-frequency radiation layer of the low-frequency radiation layer on the back surface of the circuit board and a second low-frequency radiation layer of the low-frequency radiation layer on a naked area of the front surface.

15. The antenna structure of claim 14, wherein the semi-hole electrode layers are semi-circular, semi-elliptical, or polygonal.

16. The antenna structure of claim 1, wherein the main board includes a first ground layer, a second ground layer, a first clearance zone, a second clearance zone, a first electrode fixed-connection layer, and a second electrode fixed-connection layer; the first ground layer is arranged on a front face of the main board; the second ground layer is arranged on a back face of the main board and is arranged symmetrically with the first ground layer; the first clearance zone is arranged on the front face of the main board; the second clearance zone is arranged on the back face of the main board and is arranged symmetrically with the first clearance zone; the first electrode fixed-connection layer and the second electrode fixed-connection layer are arranged on the first clearance zone; the main board further includes a signal feed-in layer arranged on the front face of the main board and coupled with the first ground layer; the signal feed-in layer is electrically connected to the first electrode fixed-connection layer.

17. The antenna structure of claim 16, wherein the main board further includes a plurality of matching elements; the first electrode fixed-connection layer and the second electrode fixed-connection layer are each electrically connected to the first ground layer through the matching elements; the matching elements are used to adjust an antenna characteristic of the antenna structure.

18. The antenna structure of claim 16, wherein the first clearance zone and the second clearance zone have a length of 10 mm to 20 mm and a width of 3 mm to 8 mm.

* * * * *